UNITED STATES PATENT OFFICE.

GUSTAV LEYSIEFFER, OF TROISDORF, NEAR COLOGNE, GERMANY.

PROCESS FOR THE MANUFACTURE OF MOLDED ARTICLES FROM CELLULOSE ETHERS.

1,427,690.     Specification of Letters Patent.    Patented Aug. 29, 1922.

No Drawing.     Application filed January 7, 1921. Serial No. 435,731.

*To all whom it may concern:*

Be it known that I, GUSTAV LEYSIEFFER, citizen of Germany, and resident of Troisdorf, near Cologne, Germany, have invented certain new and useful Processes for the Manufacture of Molded Articles from Cellulose Ethers, of which the following is a specification.

The invention relates to the manufacture of sheets and other articles from cellulose-ethers, that means from combinations of cellulose or its derivatives in which one or more hydroxyl-group or groups of the cellulose-molecule is or are substituted by an alcohol radical or radicals.

It is already known to produce celluloid-like substances from cellulose-ethers by treating such ethers with a solvent with or without the simultaneous addition of a gelatinizing agent.

In one of the known processes molded pieces are produced by following the manufacture of celluloid, that means by the application of solvents with or without the employment of gelatinizing agents sheets or rods are formed and then dried in order to remove the solvent. It is well known that the drying process requires an extraordinary long time, which in the case of a sheet of about ½" thickness already amounts to at least 100 hours. From the dried material articles may be formed by the application of mechanical labour or pressing. The pressing of molded articles from undried material is practically impossible as the molded pieces would contract and warp in consequence of the subsequent evaporation of the solvent.

Another known process consists in mixing the cellulose-ether directly with a gelatinizing agent into a plastic substance, without the application of any solvent at all. This plastic matter or substance is then pressed in heated molds, from which the article is removed ready for use.

The first-mentioned method has the disadvantage that the manufacture of molded articles according to it requires an extraordinary expenditure of time and the second-mentioned process that it is impossible to produce by it molded articles which can resist high temperatures, for instance boiling water, because the presence of gelatinizing agents or agents for rendering the material plastic make the material proof only against comparatively low degrees of heat.

The process forming the subject of this invention enables the quick and simple production of molded pieces from cellulose-ethers ready for immediate use and capable of resisting temperatures up to 140° C. without undergoing the slightest changes. The manufacture of such highly heat-proof molded articles is of the greatest importance, inasmuch as the plastic materials made of the cellulose-ethers are eminently good insulators and, for instance, in the construction of electric machinery insulators are frequently required which can stand temperatures of over 100° C.

According to the improved process a highly volatile solvent, as for instance benzol, alcohol, acetates and the like, is poured over the cellulose-ether and kneaded with it in such quantity as to just suffice to effect the complete swelling of the cellulose-ether. The plastic matter thus obtained is rolled into thin leaves upon heated rollers at a temperature which lies above the boiling point of the solvent, until all the solvent has evaporated. If necessary the drying is continued after the rolling until all the solvent has disappeared, which with thin leaves and at the existing high temperatures takes place in a very short time. The fragile leaves thus obtained are then reduced to a fine powder and the powder is introduced into steel molds heated to a temperature which lies above the melting point of the cellulose-ether and by the application of high pressure pressed into pieces or articles. By the high pressure combined with high temperatures a homogeneous material of eminently great mechanical strength is produced which considering the fragility of the intermediate product could not possibly be anticipated. The pressed body when taken from the mold is quite ready for use without any further treatment. During the kneading of the cellulose-ether with the solvent in the kneading-machine suitable filling agents or colouring matters may be added as desired.

The following will serve as an example of how the process may be carried out:

On 300 g. ethylcellulose placed in a kneading machine benzol is poured in such quantity that it just suffices to make the cellulose swell up to its highest extent. To this are added 300 g. talcum and a small quantity of colouring matter. After all the ingredients have been well mixed together to form a homogeneous substance the latter is removed from the machine and transferred to heated rollers where at a temperature of 100° C. it is rolled into very thin leaves until the solvent has completely evaporated. After the leaves have been cooled, they are reduced to a fine powder which is then introduced into a steel mold heated to about 160° C. and pressed into the desired shape or configuration.

It will be understood that the proportions of the ingredients and the temperatures and pressures applied may be varied within the scope of the claims without departing from the spirit of the invention or sacrificing any advantages of the process.

What I claim as new and desire to secure by Letters Patent is:

1. The process for the manufacture of highly heat-proof molded articles from cellulose-ethers, which consists in treating cellulose-ether with a quantity of a highly volatile solvent which just suffices to make the said cellulose-ethers to swell up to their largest extent, rolling the said substance into thin leaves at a temperature above the boiling point of the solvent, reducing the cooled leaves into a fine powder and pressing the said powder in molds heated beyond the melting point of the cellulose-ether into the desired article.

2. The process for the manufacture of highly heat-proof materials or articles from cellulose-ethers, which consists in introducing ethyl-cellulose into a kneading machine, pouring benzol over it in a quantity just sufficient to make the said ethyl-cellulose swell up to its largest extent, adding a filling agent and colouring matter as desired, thoroughly mixing the ingredients, transferring the product to rollers heated beyond the boiling point of the solvent, rolling it into thin leaves, reducing said leaves to a fine powder and pressing said powder into the desired shape in a mold heated beyond the melting point of the said ethyl-cellulose.

Signed at Troisdorf near Cologne on the Rhine, Germany this 30 day of November A. D. 1920.

Dr. GUSTAV LEYSIEFFER.